United States Patent
Purmann et al.

(10) Patent No.: US 10,026,977 B2
(45) Date of Patent: Jul. 17, 2018

(54) HUMIDIFICATION DEVICE FOR HUMIDIFYING PROCESS GASES AND FUEL CELL ARRANGEMENT COMPRISING SAME

(71) Applicant: Volkswagen Aktiengesellschaft, Wolfsburg (DE)

(72) Inventors: Mathias Purmann, Magdeburg (DE); Nils Brandau, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 585 days.

(21) Appl. No.: 14/605,574

(22) Filed: Jan. 26, 2015

(65) Prior Publication Data
US 2015/0180060 A1 Jun. 25, 2015

Related U.S. Application Data

(63) Continuation of application No. PCT/EP2013/061692, filed on Jun. 6, 2013.

(30) Foreign Application Priority Data

Jul. 25, 2012 (DE) .................. 10 2012 014 723

(51) Int. Cl.
*H01M 8/04119* (2016.01)
(52) U.S. Cl.
CPC ... *H01M 8/04149* (2013.01); *H01M 8/04141* (2013.01)
(58) Field of Classification Search
CPC .............................................. H01M 8/04149
See application file for complete search history.

(56) References Cited

U.S. PATENT DOCUMENTS

| 7,241,474 B2 | 7/2007 | Ji et al. |
| 7,875,396 B2 | 1/2011 | Zhang et al. |
| 8,048,585 B2 | 11/2011 | Skala |

(Continued)

FOREIGN PATENT DOCUMENTS

| CA | 2 286 701 A1 | 10/1998 |
| DE | 102 23 353 A1 | 12/2003 |

(Continued)

OTHER PUBLICATIONS

Machine translation of JP 2006210150 A, dated Aug. 10, 2006, retrieved Jun. 21, 2017.*

*Primary Examiner* — Maria Laios
*Assistant Examiner* — Robert S Carrico
(74) *Attorney, Agent, or Firm* — Muncy, Geissler, Olds & Lowe, P.C.

(57) ABSTRACT

A humidification device for humidifying process gases, in particular for fuel cells, having a stack of repeating components, including a steam-permeable membrane, a first layer arrangement arranged on a first side of the membrane having a first flow layer for conducting a process gas to be humidified, a multiplicity of flow channels running parallel to the membrane, a second layer arrangement arranged on a second side of the membrane having a second flow layer for conducting a humidified gas including a multiplicity of flow channels running parallel to the membrane, and two protective films which adjoin the second flow layer on both sides and have a multiplicity of through-openings.

16 Claims, 11 Drawing Sheets

(56) References Cited

U.S. PATENT DOCUMENTS

| | | |
|---|---|---|
| 8,051,992 B2 | 11/2011 | Skala et al. |
| 8,091,868 B2 | 1/2012 | Robb et al. |
| 2004/0234833 A1 | 11/2004 | Hartnack et al. |
| 2008/0001313 A1 | 1/2008 | Zhang et al. |
| 2008/0241636 A1 | 10/2008 | Andreas-Schott et al. |
| 2009/0092863 A1 | 4/2009 | Skala |
| 2010/0019400 A1* | 1/2010 | Robb ................ H01M 8/04126 261/101 |
| 2010/0323251 A1* | 12/2010 | Brandt .............. H01M 8/04149 429/413 |
| 2011/0195337 A1* | 8/2011 | Rock ................. H01M 8/04149 429/480 |
| 2012/0181712 A1* | 7/2012 | Vanderwees ...... H01M 8/04074 261/102 |

FOREIGN PATENT DOCUMENTS

| | | |
|---|---|---|
| DE | 10 2007 029 596 A1 | 1/2008 |
| DE | 10 2008 016 087 A1 | 10/2008 |
| DE | 10 2008 050 057 A1 | 5/2009 |
| DE | 10 2009 005 685 A1 | 9/2009 |
| DE | 10 2009 034 095 A1 | 3/2010 |
| DE | 11 2005 000 819 B4 | 2/2011 |
| DE | 10 2012 218 303 A1 | 4/2013 |
| EP | 1 435 121 B1 | 5/2005 |
| JP | 2006210150 A * | 8/2006 |
| WO | WO 98/45889 A1 | 10/1998 |

* cited by examiner

HUMIDIFICATION DEVICE FOR HUMIDIFYING PROCESS GASES AND FUEL CELL ARRANGEMENT COMPRISING SAME

This nonprovisional application is a continuation of International Application No. PCT/EP2013/061692, which was filed on Jun. 6, 2013, and which claims priority to German Patent Application No. DE 10 2012 014 723.6, which was filed in Germany on Jul. 25, 2012, and which are both herein incorporated by reference.

BACKGROUND OF THE INVENTION

Field of the Invention

The present invention relates to a humidification device for humidifying process gases, particularly for fuel cells, and to a fuel cell arrangement comprising such a humidification device.

Description of the Background Art

Fuel cells utilize the chemical reaction of a fuel with oxygen to form water in order to produce electrical energy. For this purpose, fuel cells contain as the core component the so-called membrane electrode assembly (MEA), which is a composite of a proton-conducting membrane and two electrodes (anode and cathode) enclosing the membrane in a sandwich-like manner. The fuel cell is typically formed by a plurality of MEAs arranged in a stack, with their electrical power being additive. During the operation of the fuel cell, the fuel, particularly hydrogen $H_2$ or a hydrogen-containing gas mixture, is supplied to the anode, where an electrochemical oxidation takes place with the release of electrons (e.g., $H_2 \rightarrow 2\ H^+ + 2\ e^-$). A (water-bound or water-free) transport of protons $H^+$ from the anode compartment to the cathode compartment occurs across the membrane, which separates the reaction chambers from one another in a gas-tight manner and isolates them electrically. The electrons provided at the anode are supplied to the cathode via an electrical circuit. The cathode is supplied in addition with oxygen or an oxygen-containing gas mixture, so that a reduction of oxygen occurs with the uptake of electrons ($\frac{1}{2}O_2 + 2\ e^- \rightarrow O^{2-}$). At the same time, in the cathode compartment the formed oxygen ions react with the protons transported across the membrane with the formation of water ($O^{2-} + 2\ H^+ \rightarrow H_2O$). Fuel cells achieve an improved efficiency by the direct conversion of chemical energy into electrical energy compared with other electricity generators because of the circumvention of the Carnot factor.

A focus of current fuel cell development is directed particularly to traction applications for the propulsion of motor vehicles. The currently most developed fuel cell technology is based on polymer electrolyte membranes (PEM), in which the membrane is made from a humidified polyelectrolyte (e.g., Nafion®) and the water-bound electrolytic conduction takes place via hydrated protons. Such polymer electrolyte membranes for proton conduction are dependent on the presence of water. Below a certain temperature, the cathodically formed product water can still be sufficient here as a humidity source for humidifying the membrane. However, at higher temperatures moisture is taken increasingly out of the fuel cell stack with the cathode exhaust gas. To counter a drying out of the fuel cell membrane here, the removal of moisture must be compensated by the active supplying of water.

WO 98/45889 A1 describes a fuel cell with an internal water supply, in which water is added in the form of an aerosol both to the fuel gas in the anode area and to the air in the cathode area. The introduction occurs via channels in the specific bipolar plate.

In addition, DE 11 2005 000 819, which corresponds to U.S. Pat. No. 7,241,474, discloses providing gas diffusion media within the fuel cell, which have hydrophobic and also hydrophilic properties or regions and thus adjust the water balance of the cell by suitable supplying and removal of moisture.

It is known, furthermore, to use external humidification devices in order to humidify the process gas to be supplied to the fuel cell, in most cases the air to be supplied to the cathode compartments. In this regard, in particular a portion of the moisture removed from the stack with the waste air of the cathode compartments is returned. The strategy of the moisture recirculation is realized for PEM fuel cells either by means of the diffusion of water across water vapor-permeable membranes and/or according to the capillary principle through very fine channels in a porous layer. So-called hollow fiber modules are suitable for the diffusion and capillary principle. Membrane humidifiers utilize the product water formed by the fuel cell reaction at the cathode during use of a water vapor-permeable membrane, in order to humidify the process gas to be supplied to the fuel cell. Not only is the drying out of the membrane prevented in this way but also an excessive accumulation of water in the fuel cell.

US 2008/0241636 A1 (DE 10 2008 016 087 A1) describes such a membrane humidifier, which is formed according to the principle of a counterflow heat exchanger, whereby a water vapor-rich gas is passed through conduits which are enclosed by a housing through which the gas mixture to be humidified flows in a counterflow. The conduits has a water vapor-permeable membrane material.

DE 10 2009 005 685 A1, which corresponds to U.S. Pat. No. 8,051,992, discloses an external membrane humidification device, which has a stack of corrugated plates each with a membrane disposed therebetween. Flow channels, through which some of the relatively moist cathode exhaust gas flows and some of the cathode air to be humidified as well, are formed by the corrugated plates. The membrane is contacted on both sides by a layer of a hydrophilic diffusion medium, which, on the one hand, is to take up water and to transport it to or from the membrane and, on the other, is to support the membrane structurally.

US 2009/0092863 A (DE 10 2008 050 507 A1) describes a membrane humidifier, which has a stack of alternating wet plates and dry plates, between which a water vapor-permeable membrane is arranged. Each wet and dry plate includes two gas diffusion layers, between which lands are arranged that define the flow channels. The flow channels of the wet plate conduct wet exhaust air from the cathode side of the fuel cell and the flow channels of the dry plate conduct relatively dry process gas that is supplied to the fuel cell. The plates are sealed laterally by massive plastic strips.

The membrane humidifiers disclosed in US 2008/0001313 A1 correspond to the previously described humidifier but have different channel structures. Here the channels of the wet and dry plates are produced by plates with a corrugated sheet structure or by plates with grooves on both sides, instead of by lands.

The prior-art external humidification devices for fuel cells when using water vapor-permeable membranes have in common that the membrane is always enclosed on both sides by layers of a diffusion medium, particularly a nonwoven made of glass fibers or a plastic, e.g., polyether ketone (PEEK), polyether imide (PEI), or polysulfone (PSU). The diffusion layers have transport functions for the water vapor by means of convection and a support function for the membrane. A disadvantage of the use of such diffusion layers in the form of nonwovens, on the one hand, is the relatively large layer thickness of the nonwoven that is typically within the range of 200 μm. Because of the high number of diffusion layers present in a humidification device, this leads, on the one hand, to long flow paths through the diffusion layer and, on the other, to a high installation space requirement, which particularly in vehicles is often not available. Moreover, nonwovens have a relatively small free area of typically less than 50%, which leads to a reduced water transport rate.

SUMMARY OF THE INVENTION

It is therefore an object of the present invention to provide a humidification device for humidifying process gases particularly of fuel cells, which in the case of a relatively small installation space requirement assures a high moisture transfer rate to the process gas to be humidified.

The object is achieved, in an embodiment, by a humidification device for humidifying process gases and a fuel cell arrangement having the same.

The humidification device of the invention comprises a stack of repeating components, having a water vapor-permeable membrane, a first layer arrangement arranged on a first side of the membrane including a first flow layer for conducting a process gas to be humidified, comprising a plurality of flow channels running parallel to the membrane and a second layer arrangement arranged on a second side of the membrane having a second flow layer for conducting a humidified gas, comprising a plurality of flow channels running parallel to the membrane, and two protective films that adjoin the second flow layer on both sides and have a plurality of through-openings in a central area.

In this case, the term "water vapor-permeable membrane" can be understood to be, for example, a membrane that is permeable to gaseous water (superheated steam) and/or partially condensed water (wet steam). At the same time, the membrane should be as impermeable as possible to other gas components, in other words, to be as selectively permeable as possible to water vapor. Suitable materials comprise hydrophilic polymers and polymer composites, for example, poly(perfluorosulfonic acid) (sulfonated tetrafluoroethylene polymer), which can be obtained, for instance, under the trade name Nafion®.

The term "process gas" can designate, for example, a relatively low-water-vapor (dry) gas or gas mixture, for example, a gas or gas mixture to be supplied to the cathode of a fuel cell, particularly oxygen or an oxygen-containing gas mixture such as air, and/or a gas or gas mixture to be supplied to the anode, particularly hydrogen or a hydrogen-containing gas mixture.

Furthermore, the term "humidified gas" can designate, for example, a relatively high-water-vapor gas or gas mixture, whose moisture content is greater than that of the process gas. In particular, the humidified gas is a relatively high-water-vapor (wet) gas or gas mixture discharged from the cathode and/or anode compartment of a fuel cell. The components making up the stack—membrane, flow layer, protective film, and spacer film—are flat components, particularly films or plates, in which the dimensions of their two main surfaces are greater by at least one order of magnitude, particularly at least two orders of magnitudes, than those of the four narrow edge surfaces. Thus, layers adjoining one below the other are taken to mean that these respective layers adjoin another with their main surfaces. In this case, the components can adjoin one another directly, without a further intermediate layer, or indirectly, separated from one another by one or more intermediate layers, for example, by an adhesive layer.

In the following, the first layer arrangement is also designated as a dry layer arrangement ("dry plate") in line with the relatively dry process gas conducted therein and the second layer arrangement also as a wet layer arrangement ("wet plate") in line with the relatively wet humidified gas conducted therein.

The components, comprising the water vapor-permeable membrane, the first layer arrangement, and the second layer arrangement, form structural units. A plurality of said structural units repeat in the stack of the invention, which, disposed in a suitable housing, represents the core component of the fuel-cell-external process gas humidifier.

In an embodiment, the stacking of the components occurs so that a membrane layer is arranged between a pair of dry and wet layer arrangement, to enable the diffusion of water vapor from the humidified gas into the process gas, if possible without having to accept an exchange of other gas components. For example, the stack comprises the following component sequence: first layer arrangement (dry layer arrangement); membrane; second layer arrangement (wet layer arrangement); membrane; first layer arrangement (dry layer arrangement); membrane; second layer arrangement (wet layer arrangement); membrane . . . membrane; and second layer arrangement (wet layer arrangement).

According to an embodiment of the invention, the diffusion layer typical for the prior art in the form of a nonwoven at least on the wet side of the membrane, which is usually the low pressure side, is replaced by a protective film with a plurality of through-openings. The protective film thus has the task of mechanically supporting the membrane on its low pressure side in order to prevent its bulging in the direction of the low pressure side. On the other hand, the protective film must enable a sufficient gas flow of the humidified gas to the membrane. The path of the humidified gas to the membrane is considerably shortened by the replacement of the nonwoven by the protective film and, moreover, the flow-retarding effect of the nonwoven is circumvented. Furthermore, the moisture transport from the humidified gas to the membrane surface can be influenced selectively by an increased movement of the humidified gas in the vicinity of the membrane. The flow rates can be selected so that turbulences occur in the flow channels and lead to an improvement of the moisture transport.

A further advantage of using the protective film is the extensive incompressibility and stability of a film. Thus, bulging of the protective film in the direction of the low pressure side can be very largely avoided. In addition, pressure losses can be kept low and be predicted accurately by the stable channel geometry achieved thereby. The prediction of pressure losses also allows defined turbulent flows within a window of the maximum allowable pressure losses, which in turn enable an increased moisture transport. In contrast to nonwovens, which can be pressed together relatively easily, a higher stability results in addition in the pressing direction of the stack. This stability can also be maintained, after the stack was compressed once during its construction and a pressing force is not constantly exerted on the stack.

According to an embodiment of the invention, the protective film in the active area having the through-openings can have a free area in the range of 20 to 80%, particularly in the range of 40 to 70%, preferably in the range of 55 to 65% of its total area. If the proportion of free area is below the indicated bottom thresholds, a reduced moisture exchange between the humidified gas and membrane occurs. If, on the other hand, the free area is above the indicated top threshold, the supporting function of the protective film for the membrane is greatly reduced. The preferred range of a 55 to 65% proportion of free area in particular leads to an increased water transport rate, compared with conventional nonwovens which typically have a free surface area of less than 50% of their total area. The required membrane area decreases due to the higher water transport rate, so that a smaller component volume can be achieved with the same water transport capacity.

The through-openings of the protective film can have any designs desired. They preferably have a circular shape, whereby diameters of at most 1 mm, particularly at most 700 µm, preferably at most 400 µm, are preferred. In other words, the free area is preferably distributed over a high number of corresponding smaller through-openings, in order to achieve in this way a homogeneous supportive effect over the entire active area.

The first layer arrangement conducting the relatively dry process gas can further comprise two spacer films which adjoin the first flow layer on both sides and have a circumferential frame region and at least one central recess, bounded by the circumferential frame region. The spacer film thus has the shape of a frame, whereby preferably the entire central active area is left open. According to this embodiment, also the diffusion medium layer, conventional in the prior art, is therefore replaced on the high pressure side of the membrane by a film structure. The previously described advantages of the humidification device of the invention can be enhanced still further in this way.

The protective films and/or spacer films preferably independently of one another comprise a metal, a plastic, or a composite material, or they are formed of such a material. Preferably, a metal, particularly a stainless steel, is used.

The protective and/or spacer films used as taught by the invention independently of one another can have a layer thickness in the range of 20 to 120 µm, particularly in the range of 30 to 100 µm, preferably in the range of 40 to 60 µm. Compared with the diffusion media conventional in the prior art, which typically have a layer thickness of about 200 µm, a considerable reduction of the total layer thickness and therefore of the component volume can be achieved. The volume of the humidification device therefore decreases not only due to the reduced membrane area (see above), but also due to the reduced layer height of the stack.

Preferably, therefore, the repeating components of the stack do not comprise any porous layer of a diffusion medium in the form of nonwovens or the like.

According to an embodiment, the (process gas-conducting) flow channels of the first flow layer and the (humidified gas-conducting) flow channels of the second flow layer are oriented running in different directions, particularly in intersecting directions (cross flow). An especially high moisture transfer rate is achieved in this way. In an especially preferred embodiment, the flow lands and thereby the flow channels run in parallel planes, but offset by 90° to one another.

In an embodiment of the invention, the flow channels of the first and/or second flow layer are designed open on both sides and are formed by a plurality of flow lands running spaced apart from one another. For example, the first and/or second flow layer in each case can be formed as films, in whose active central area a plurality of longitudinal openings are formed that are bounded by the flow lands running therebetween.

Advantageously, at least the components of the first (process gas-conducting) layer arrangement and/or the components of the second (humidified gas-conducting) layer arrangement can each be joined to one another. This occurs particularly by an adhesive layer adjoining the flow layer on both sides, whereby particularly adhesives with an acrylic or silicone base are used, preferably acrylic adhesives. Preferably, further, adhesive layers can be present between the water vapor-permeable membrane and the adjoining first and second layer arrangement, whereby particularly adhesives with an acrylic or silicone base are used, here preferably silicone adhesives. In this regard, all adhesive layers are preferably present at least in the circumferential edge region surrounding the active central area, so that a seal is achieved here. Compared with sealing strips, as they are described in the prior art, the formation of adhesive seals has the advantage of also sealing the stack outwardly in the same work step as the joining together of the different components of the stack.

The joining together of the individual components by application of adhesive layers can occur, for example, in a continuous rolling process.

The stack of the invention of repeating components—membrane and first and second layer arrangement—is preferably arranged in a holding cartridge, which brings about a fixation and pressing of the components one under the other. In this case, the stack in the holding cartridge is disposed preferably in a housing that is formed to connect the plurality of flow channels of the first layer arrangements to a process gas supply, particularly a fuel cell, and to connect the plurality of flow channels of the second layer arrangements to a humidified gas line, particularly an exhaust gas discharge line of a fuel cell.

A further aspect of the invention relates to a fuel cell arrangement, which comprises a fuel cell stack with a plurality of cathode and anode sections, an anode process gas supply for supplying the anode sections with fuel, for example, hydrogen, and a cathode process gas supply for supplying the cathode sections with a cathode process gas, particularly oxygen or an oxygen-containing gas mixture such as air. In this case, the cathode process gas supply and/or the anode process supply comprise a humidification device according to the present invention for humidifying the cathode process gas or the anode process gas.

For this purpose, the cathode or anode process gas is in fluid communication preferably with the first flow layer of the humidification device and the cathode or anode exhaust gas is in fluid communication with the second flow layer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
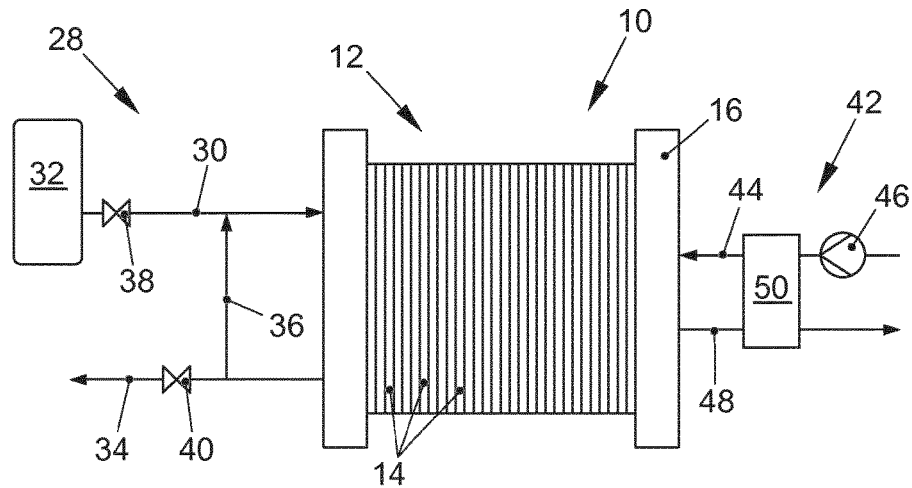
FIG. 1 shows a fuel cell arrangement with a humidification device according to an embodiment of the invention.

A fuel cell arrangement 10 with a fuel cell stack 12 (also simply called a fuel cell), which comprises a plurality of single cells 14 connected in series, is illustrated in FIG. 1. Fuel cell stack 12 is held together on both sides by two end plates 16.

Figure 2:
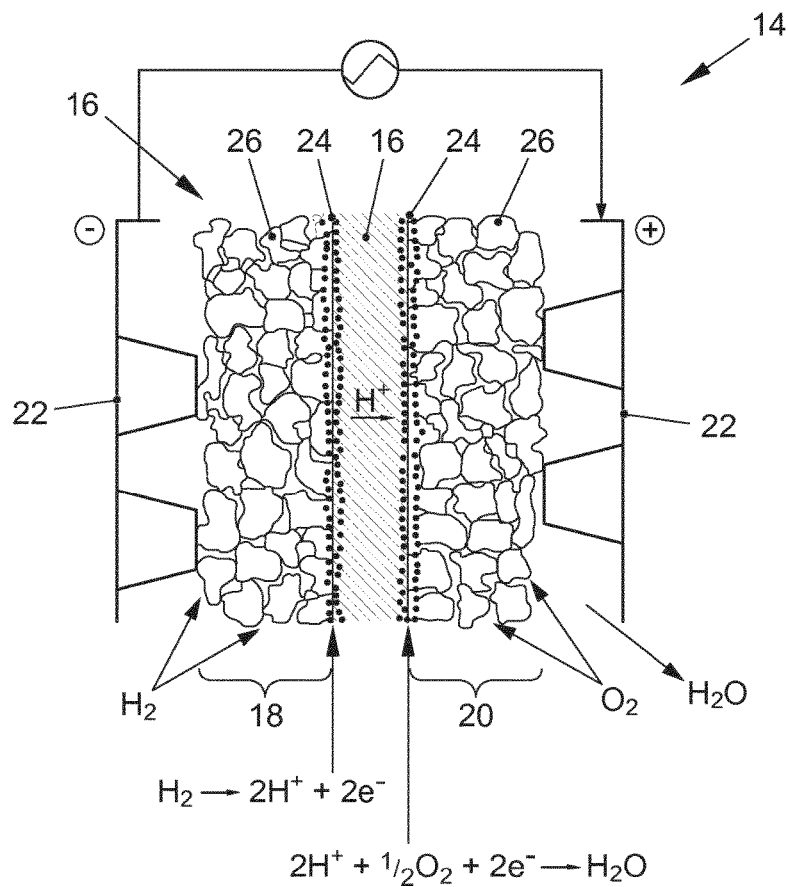
FIG. 2 shows a single cell of the fuel cell from FIG. 1 in a sectional view.

An individual exemplary single cell 14 is shown in greater detail in FIG. 2. Each single cell 14 has a membrane electrode assembly (MEA), each of which comprises a proton-conducting polymer electrolyte membrane 16 (for example, a poly(perfluorosulfonic acid) membrane with the trade name Nafion®) and two electrodes adjoining the two outer membrane surfaces in a sandwich-like manner, namely, an anode 18 and a cathode 20. Further, single cells 14 comprise bipolar plates 22, which are arranged between two MEAs and contact the MEA composite electrically on both sides and provide for the supplying of the process gas and the removal of the exhaust gases and the product water. In addition, they separate the individual MEAs in fuel cell stack 12 from one another in a gas-tight manner. Bipolar plates 22 have a plurality of inner transport channels, which serve to supply the reaction gases (typically hydrogen in the case of the anode and oxygen or air in the case of the cathode) and on the cathode side also the removal of the product water. Materials for sealing and stabilizing the MEAs are not shown.

Anode 18 and cathode 20 in the shown example as designed as gas diffusion electrodes and in each case comprise a microporous catalyst layer 24, which is applied to a gas diffusion layer (GDL) 26. Catalyst layer 24 comprises a carbon-containing backing material or a material formed of entirely of carbon (graphite), which supports a catalytic material as the actual reactive sites; the catalytic material is usually a precious metal such as platinum, iridium, or ruthenium, or a transition metal such as chromium, cobalt, nickel, iron, vanadium, or tin, or mixtures or alloys thereof. The backing material is used, on the one hand, for the electrical connection of the catalytic material and, on the other, has a fixing and surface-enlarging effect. The function of GDL 26 is to assure a uniform flow to catalyst layers 24 of the reaction gases, oxygen or air, on the cathode side and hydrogen on the anode side. Other designs of the electrodes can also be used within the scope of the present invention. For example, microporous catalyst layers 24 can also be applied directly to the membrane surface instead of to GDL 26.

Fuel cell 10 further according to FIG. 1 has an anode process gas supply 28 for supplying the anode section of cells 14 with hydrogen. Anode process gas supply 28 comprises an anode process gas line 30, which is in communication, on the one hand, with a hydrogen tank 32 and, on the other, with the anode sections of fuel cell 12. An internal anode-side channel system of bipolar plates 22 conducts the supplied hydrogen $H_2$ to anodes 18 of single cell 14, where it is oxidized to protons $H^+$ with the release of electrons. The unused remaining hydrogen (and product water that diffused through membrane 16) is removed via an anode exhaust gas line 34, which is in communication with a further anode-side internal channel system of bipolar plates 22. A recirculation line 36 connects anode exhaust gas line 34 with anode process gas line 30, so that unused hydrogen can be returned to the circulation. The anode exhaust gas recirculation is advantageous because fuel cell 12 is typically operated with a hydrogen excess (hyperstoichiometric) compared with the cathode-side oxygen, so that the hydrogen is not completely converted. The operating pressure and recirculation rate are controllable via corresponding valves 38, 40.

Further, fuel cell 10 has a cathode process gas supply 42 with a cathode process gas line 44 and conveying device 46, for example, a pump, in order to supply air and therefore oxygen to bipolar plates 22 and from there via a cathode-side channel system of the same to cathodes 20. The removal of the remaining air and product water occurs via another cathode-side channel system of bipolar plates 22 and a cathode exhaust gas line 48 connected thereto.

In order to achieve sufficient humidification of polymer electrolyte membrane 16 of single cells 14 of fuel cell 12, cathode process gas supply 42 according to the invention further has a humidification device 50 for humidifying the cathode process gas (air) with a partial return of the product water formed on the cathode side and removed via cathode exhaust gas line 48 from fuel cell 12. For this purpose, humidification device 50 is connected both to cathode process gas line 44 and cathode exhaust gas line 48. Alternatively or in addition, anode process gas supply 28 can also be equipped with a suitable humidification device 50, whereby in this case the product water that has diffused through polymer electrolyte membrane 16 and has been removed with the anode exhaust gas is used for humidifying the anode process gas (hydrogen).

Other components of fuel cell 12 are not shown in FIG. 1, for example, a cooling system, temperature and pressure sensors, and the like, as well as electronic controller for controlling fuel cell 12 and components connected thereto.

Humidification device 50 of the invention is shown in greater detail in FIGS. 3 to 12.

Figure 3:
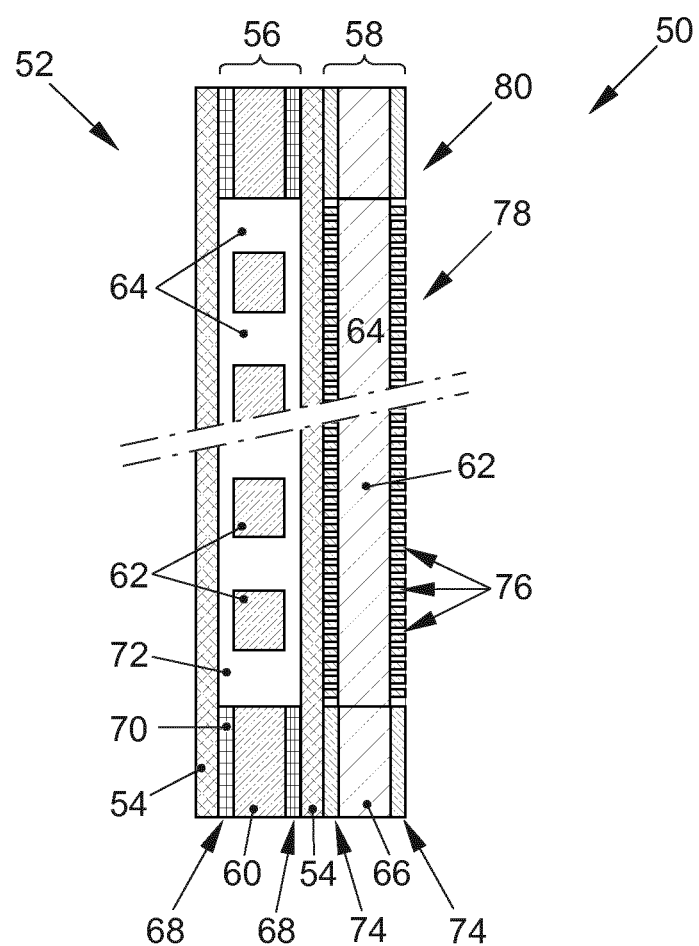
FIG. 3 shows a section of a humidification device according to an embodiment of the invention in a sectional view.

FIG. 3 shows a section of a stack 52 with repeating components for humidification device 50 of the invention. These comprise a water vapor-permeable membrane 54, a first layer arrangement 56 arranged on a first side of membrane 54 (also called a dry layer arrangement below), and a second layer arrangement 58 arranged on a second side of membrane 54 (also called a wet layer arrangement below).

Dry layer arrangement 56 comprises a first flow layer 60, which comprises a plurality of flow lands 62 which run parallel to membrane 54 and define a plurality of flow channels 64 also running parallel to membrane 54. Flow lands 62 and flow channels 64 of first flow layer 60 in the selected illustration of FIG. 3 run perpendicular to the plane of the paper. In a similar way, wet layer arrangement 58 as well comprises a plurality of flow lands 62 which run parallel to membrane 54 and between which flow channels 64 are formed. Flow lands 62 and flow channels 64 of dry layer arrangement 56 and wet layer arrangement 58 preferably run according to the cross-flow principle, i.e., in directions that are offset by 90° to one another. Accordingly, flow lands 62 and flow channels 64 of wet layer arrangement 58 run parallel to the plane of the paper according to the illustration of FIG. 3.

Dry layer arrangement 56 with its flow channels 64 is used for conducting the process gas to be humidified, particularly for a fuel cell 12, as it is illustrated in FIGS. 1 and 2. Preferably it is used for conducting a process gas, particularly air, to be supplied to the cathodes of a fuel cell. Wet layer arrangement 58 with its flow channels 64, in contrast, is used to conduct a humidified gas, which has a higher moisture content than the process gas, particularly the cathode exhaust gas of fuel cell 12.

Dry layer arrangement 56 further has two spacer films 68 adjoining first flow layer 60 on both sides. Spacer films 68 comprise a circumferential edge region 70, which bounds a central recess 72. The function of spacer film 68 is to protect sensitive membrane 54 from direct contact with flow lands 62 of dry layer arrangement 56. In addition, the free membrane surface is maximized by the created distance between lands 62 and membrane 54.

Wet layer arrangement 58, in contrast, has two protective films 74 which enclose second flow layer 66 in a sandwich-like manner. Protective film 74 is characterized by a plurality of small through-openings 76, which can have, for example, a circular shape. The task of protective film 74 is to support mechanically water vapor-permeable membrane 54 on its low-pressure side. At the same time, it should enable the best possible gas exchange between flow channels 64 and membrane 54.

It is understood that stack 52 as the central component of humidification device 50 has a plurality of the structural unit shown in FIG. 3. In this case, dry layer arrangement 56 and wet layer arrangement 58 are stacked alternately on one another, whereby in each case a layer of a water vapor-permeable membrane 54 is inserted between them.

It can be seen further in FIG. 3 that stack 52 has a central active area 78, which is surrounded frame-like by an edge region 80. The actual water vapor transport across membrane 54 occurs only in active area 78. Edge region 78 [sic, 80] has a predominantly stabilizing and sealing function. Adhesive layers, which are preferably present between all layers of stack 52, particularly in each case in edge region 80, are not shown in FIG. 3, so that here connection of the components to one another and sealing toward the outside occur by the adhesive layers.

Details on the structure of wet layer arrangement 58 and its individual components are shown in FIGS. 4 to 7.

In FIGS. 4A to 4D, the individual layers of wet layer arrangement 58 are shown according to a special exemplary embodiment.

Figure 4A:
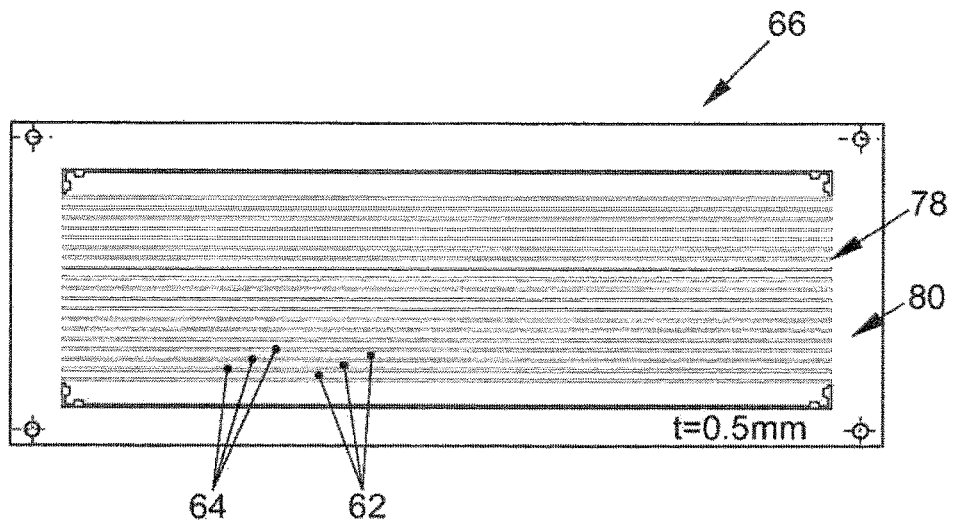
FIG. 4A shows a flow wet layer arrangement of a humidification device of the invention.

FIG. 4A shows an example for second flow layer 66 of wet layer arrangement 58. As can be seen, a plurality of flow lands 62 of the film, which delimit flow channels 64 running therebetween, are formed in active area 78. In particular plastics, such as polyether ketones (PEEK), polyether imides (PEI), polysulfones (PSU), and the like, or metals, particularly high-grade steel and light metals, such as aluminum or magnesium and alloys thereof may be used as the material for a second flow layer 66 formed as a film. A high-grade steel was used in the present example. Suitable layer thicknesses are in the range of 0.1 to 1.0 mm, particularly 0.3 to 0.8 mm. In the present example, the layer thickness of second flow layer 66 and therefore land height is 0.5 mm. Flow channels 64 can be produced, for example, by means of laser cutting or punching out of a continuous film.

Figure 4B:
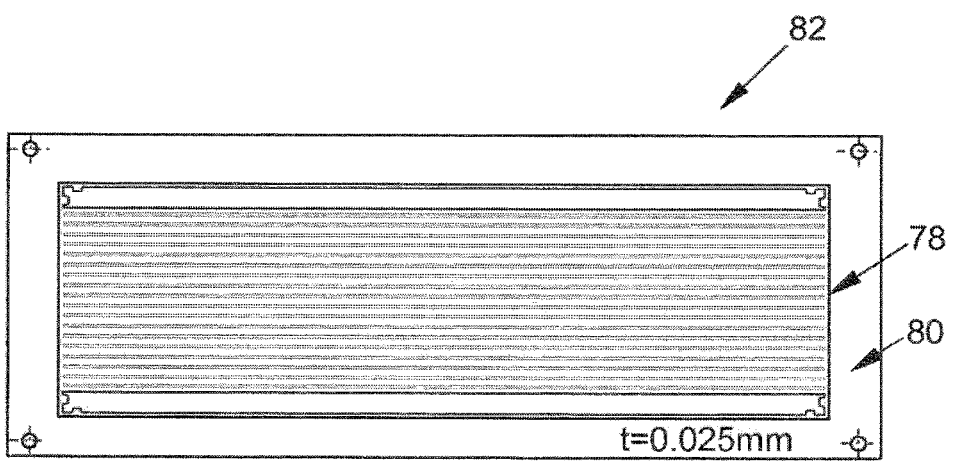
FIG. 4B shows an adhesive wet layer arrangement of a humidification device of the invention.

FIG. 4B shows an example for an adhesive layer 82, which is applied preferably on both sides to flow layer 66. In the shown example, adhesive layer 82 has the same cut as flow layer 66 shown in FIG. 4A; i.e., it also recreates the lands. In an alternative embodiment, however, active area 78 can be adhesive-free, whereas only edge region 80 has a continuous adhesive layer. Typical layer thicknesses for adhesive layer 82 are in the range of 0.01 to 0.1 mm. In the illustrated exemplary embodiment, the layer thickness is 0.025 mm. Adhesives with an acrylic or silicone base may be used as adhesives, whereby in the present case an acrylic adhesive was used.

Figure 4C:
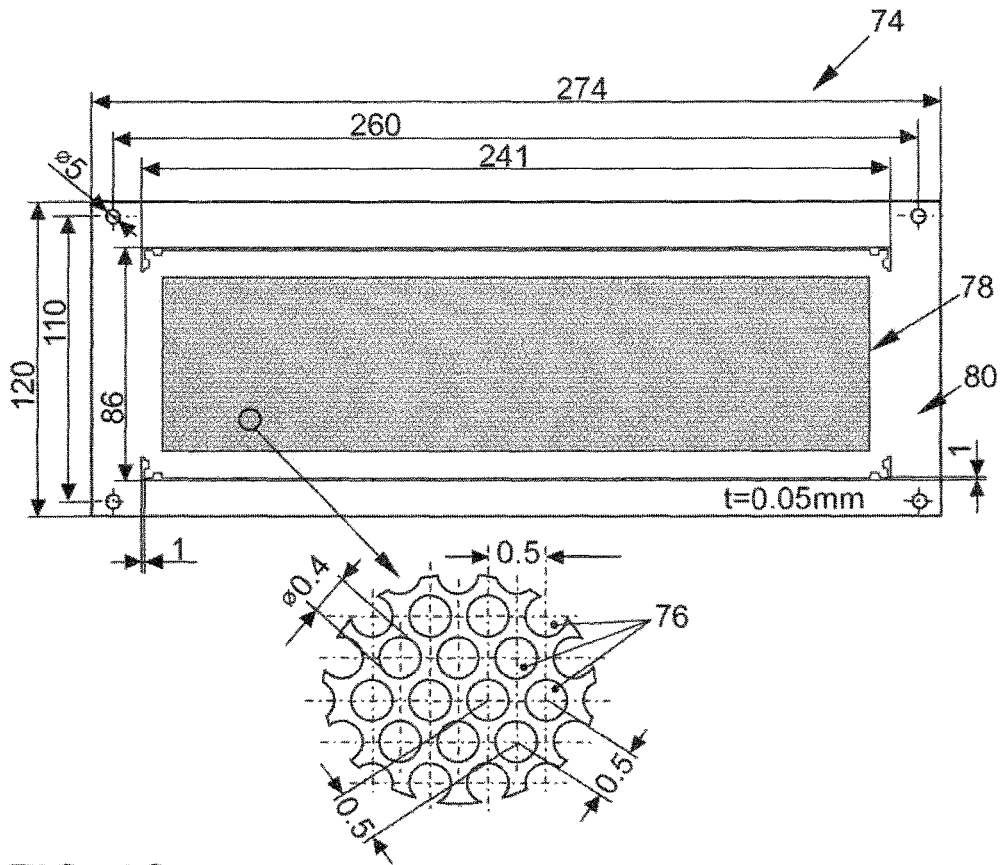
FIG. 4C shows a protective film wet layer arrangement of a humidification device of the invention.

FIG. 4C shows an example for a protective film 74, which has a plurality of openings 76 in its active area 78. It can be seen in the detailed illustration that in the present example openings 76 have a circular shape. According to the present exemplary embodiment, through-openings 76 have a diameter of 0.4 mm, whereby an area in active area 78 was about 58%. The layer thickness of protective film 74 was 0.05 mm. Considerations as materials are basically those discussed in relation to flow layer 66, whereby in the present example stainless steel was used for protective film 74.

Figure 4D:
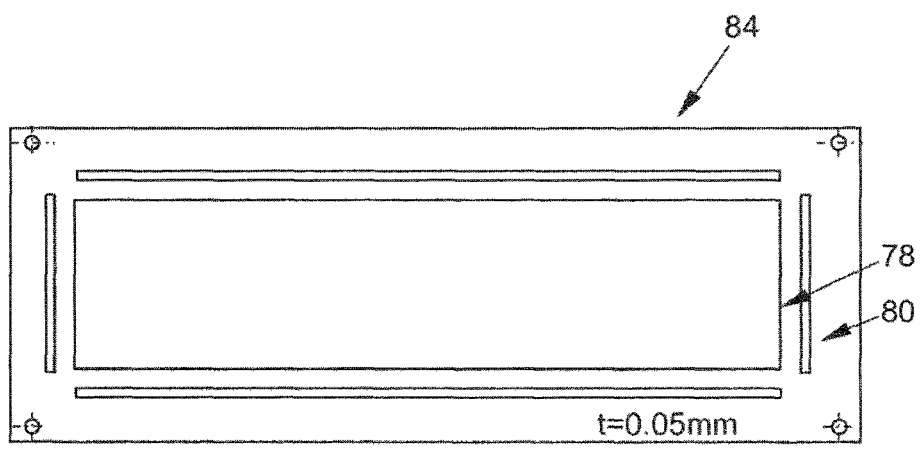
FIG. 4D shows an adhesive wet layer arrangement of a humidification device of the invention.

FIG. 4D shows an exemplary embodiment of an adhesive layer 84, which is arranged preferably on both outer sides of wet layer arrangement 58, therefore on protective films 74. Here, the adhesive layer is provided exclusively in the circumferential edge region 80, whereas central active area 78 remains adhesive-free. Particularly adhesives with an acrylic or silicone base, preferably a silicone base, can again be used as adhesives. Typical layer thicknesses for adhesive layer 84 are in the range of 0.01 to 0.1 mm, whereby in the present case the layer thickness was 0.05 mm.

Figure 5:
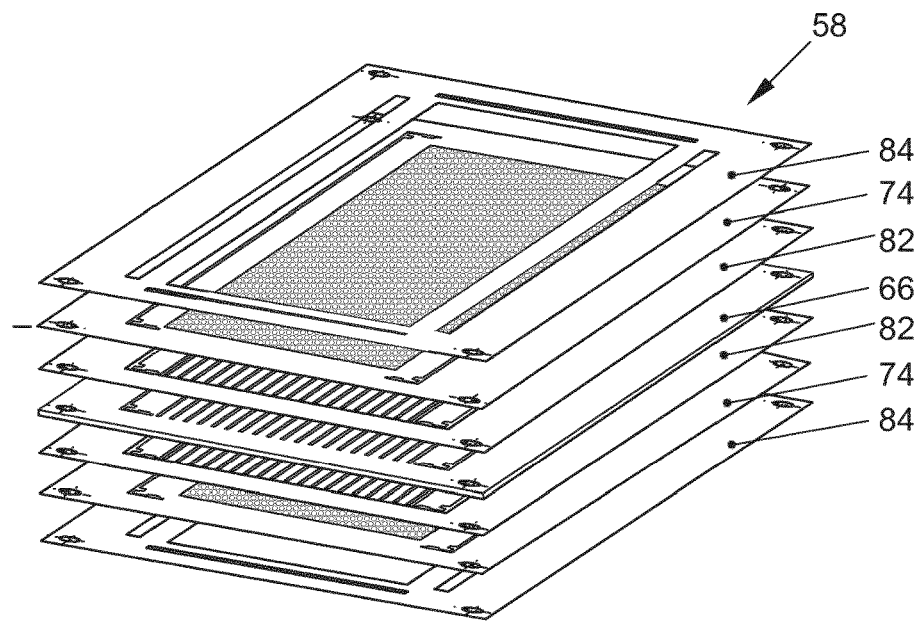
FIG. 5 shows an exploded illustration of a wet layer arrangement of a humidification device of the invention.

FIG. 5 shows the structure of second layer arrangement 58 (wet layer arrangement) in an exploded illustration. In this case, central flow layer 66 with its flow lands and flow channels is enclosed on both sides by an adhesive layer 82 in a sandwich-like manner. A protective film 74 according to the present invention again adjoins adhesive layers 82. The arrangement closes with a further adhesive layer 84.

Figure 6A:
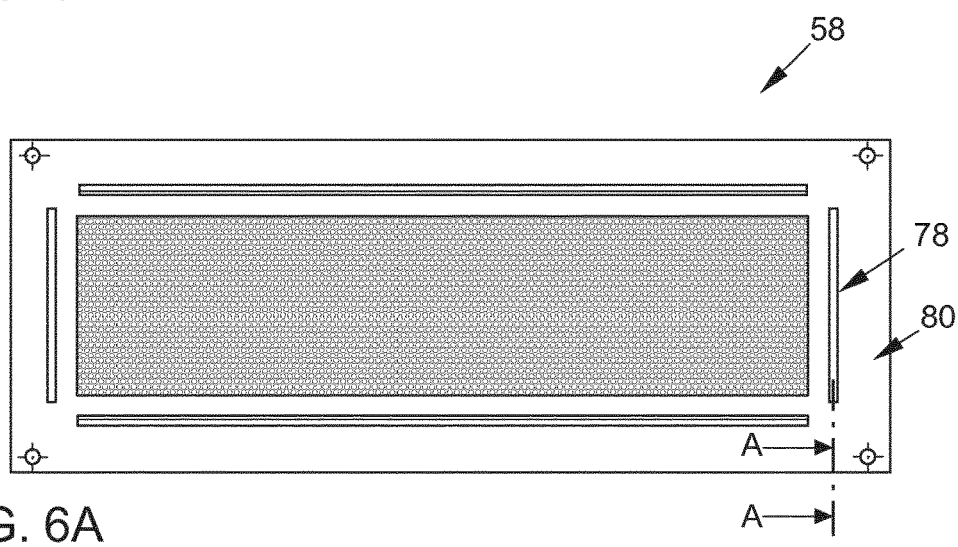
FIG. 6A shows a plan view of a wet layer arrangement of a humidification device of the invention before its cutting.

FIG. 6 shows wet layer arrangement 58 after its joining by means of adhesive layers 82 and 84 in a plan view (FIG. 6A).

Figure 6B:
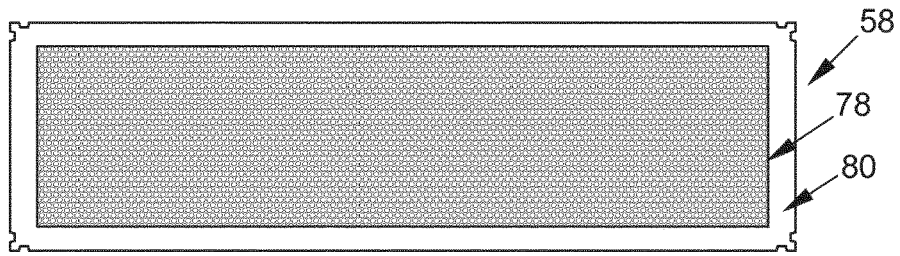
FIG. 6B shows a plan view of a wet layer arrangement of a humidification device of the invention after its cutting.

The joining can occur, for example, by means of a continuous rolling process. It is also advantageous initially to keep the outer adhesive layers 84 still coated by a backing film (paper or plastic), which is removed only before the joining and pressing with membrane 54. After the joining together of the individual layers, wet layer arrangement 58 is cut to its final size (FIG. 6B).

Figure 7:
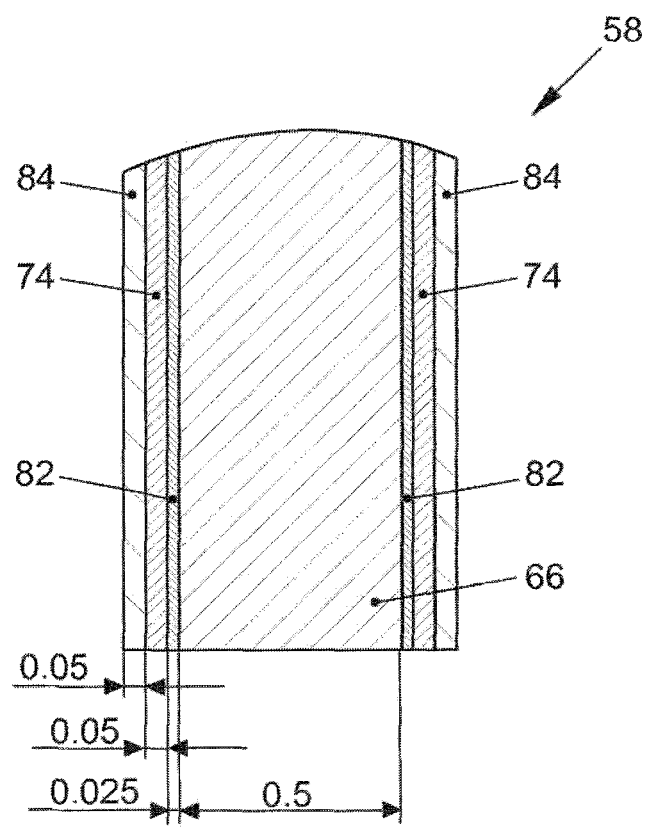
FIG. 7 shows a sectional view of a wet layer arrangement of a humidification device of the invention.

FIG. 7 shows the structure of wet layer arrangement 58 according to the illustrated exemplary embodiment in a cross-sectional detailed view, in which the layer thickness are also evident (specifications in mm).

Details on the structure of dry layer arrangement 56 and its individual components are illustrated in FIGS. 8 to 11.

The individual layers of dry layer arrangement 56 according to a special exemplary embodiment are shown in FIGS. 8A to 8D.

Figure 8A:
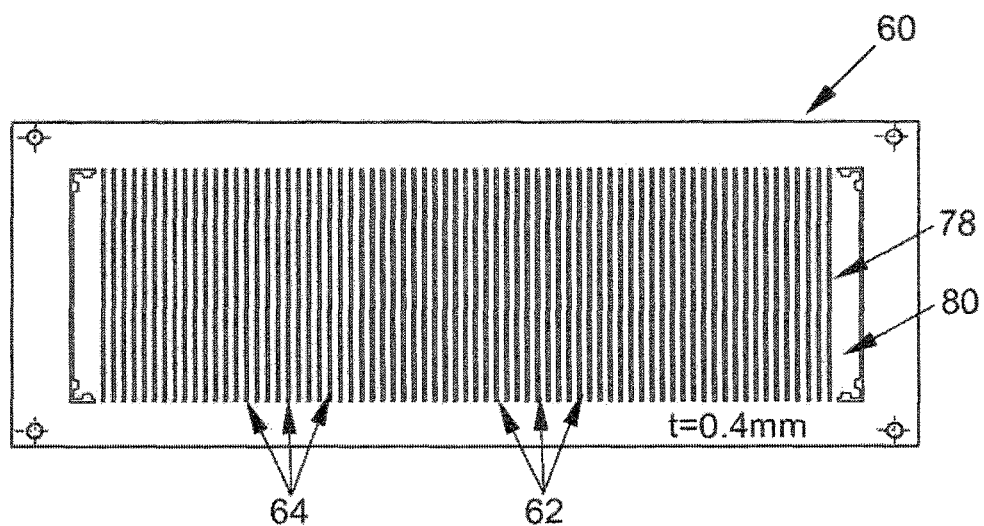
FIG. 8A shows a flow dry layer arrangement of a humidification device of the invention.

FIG. 8A shows an example for first flow layer 60 of dry layer arrangement 56. As can be seen, a plurality of flow lands 62 of the film, which delimit flow channels 64 running therebetween, are formed in active area 78. In order to obtain the desired cross flow, flow lands 62 and channels 64 of first flow layer 60 of dry layer arrangement 58 run transverse to those of second flow layer 66 of wet layer arrangement 68 (cf. FIG. 4A). The statements made for second flow layer 66 apply in regard to the materials for first flow layer 66, formed as a film, and to the layer thicknesses (land heights).

Figure 8B:
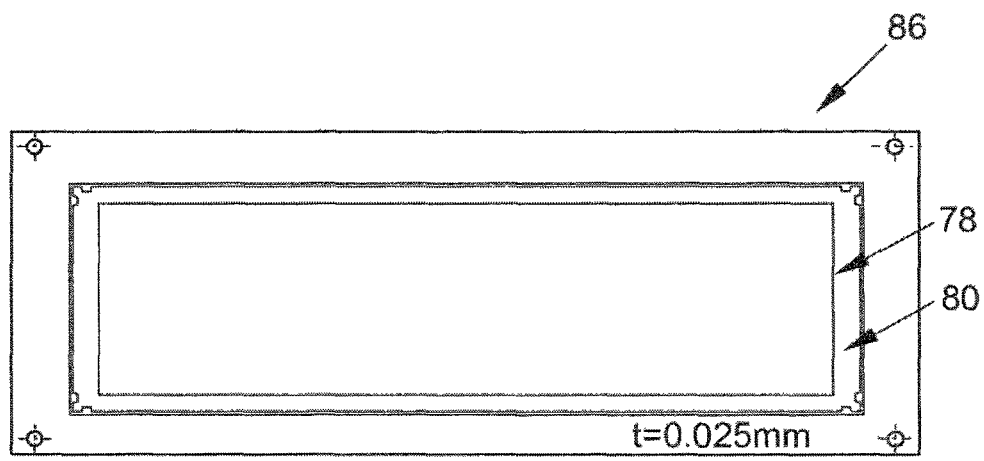
FIG. 8B shows an adhesive dry layer arrangement of a humidification device of the invention.

FIG. 8B shows an example for an adhesive layer 86, which is preferably applied on both sides to flow layer 60. In the illustrated example, active area 78 is adhesive-free, whereas only edge region 80 has a continuous adhesive layer. Typical layer thicknesses and materials for adhesive layer 86 correspond to those for adhesive layer 82 (FIG. 4B).

Figure 8C:
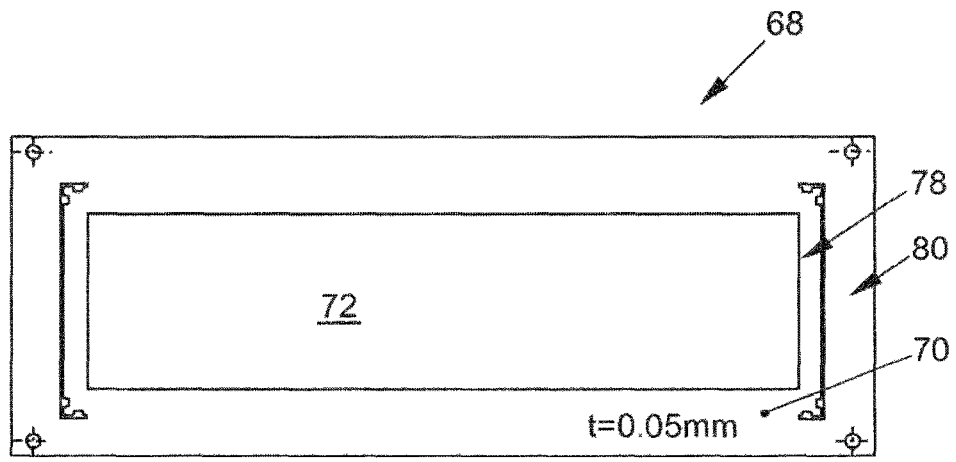
FIG. 8C shows a spacer film dry layer arrangement of a humidification device of the invention.

FIG. 8C shows an example for a spacer film 68 of the invention. It is characterized by a large central recess 72 (window), which leaves open the entire active area 78. Recess 72 is surrounded by frame region 70, which performs the spacer function between flow layer 60 and membrane 54. The statements for protective film 74 apply accordingly in regard to the materials and layer thicknesses. In the present example, stainless steel was used for spacer film 68 and the layer thickness was 0.05 mm.

Figure 8D:
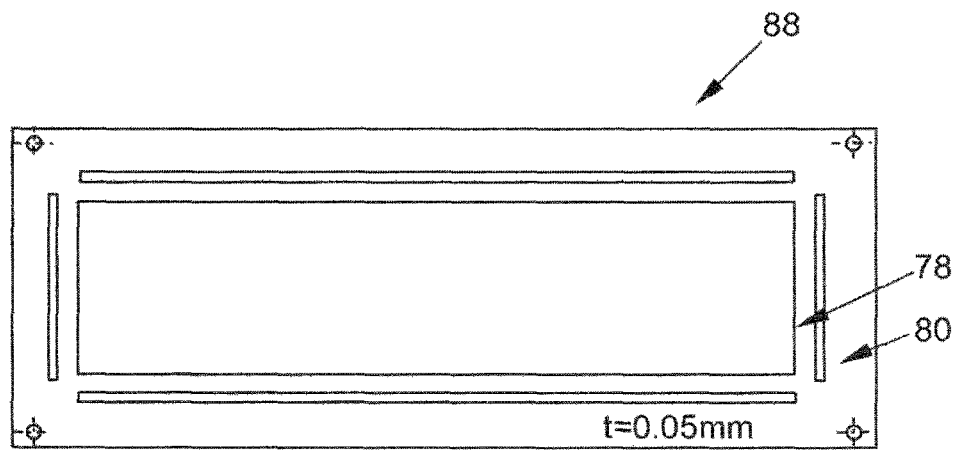
FIG. 8D shows an adhesive dry layer arrangement of a humidification device of the invention.

FIG. 8D shows an exemplary embodiment of an adhesive layer 88, which is arranged preferably on both outer sides of wet layer arrangement 58, therefore on protective films 74. The statements made in regard to adhesive layer 84 apply. In the present case, an adhesive with a silicone base was used and the layer thickness was 0.05 mm.

Figure 9:
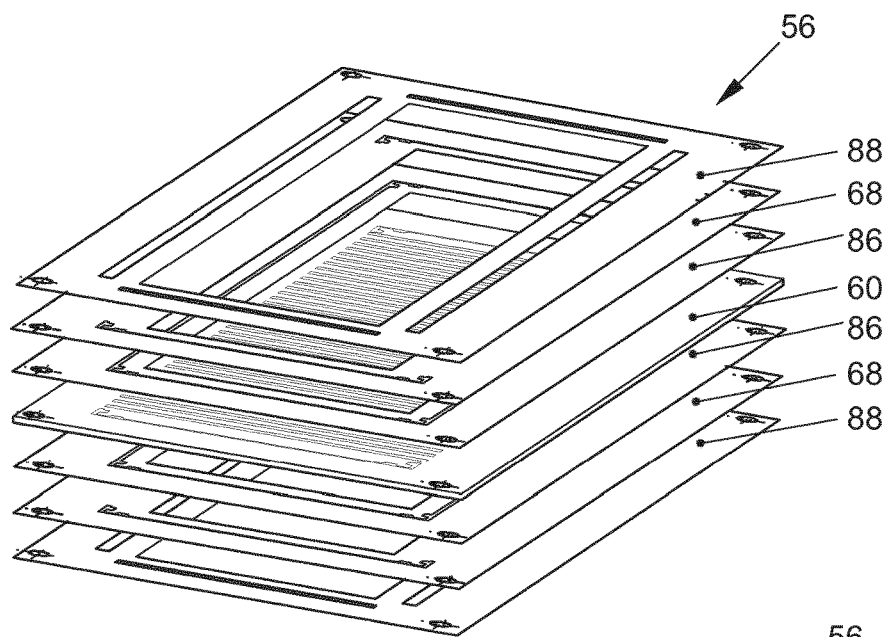
FIG. 9 shows an exploded illustration of a dry layer arrangement of a humidification device of the invention.

FIG. 9 shows the structure of first layer arrangement 56 (dry layer arrangement) in an exploded illustration. In this case, central flow layer 60 with its flow lands and flow channels is enclosed on both sides in each case by an adhesive layer 86 in a sandwich-like manner. A spacer film 68 according to the present invention again adjoins adhesive layers 86. The arrangement closes with a further adhesive layer 88.

Figure 10A:
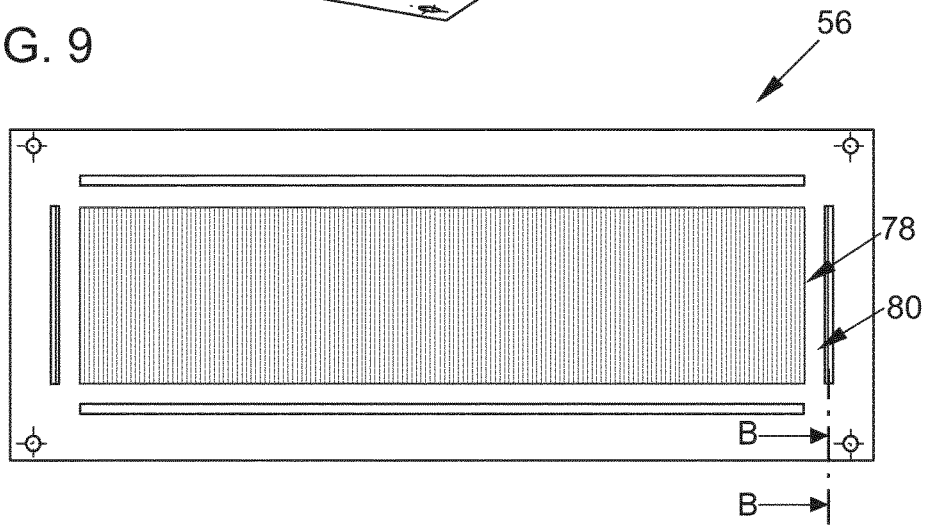
FIG. 10A shows a plan view of a dry layer arrangement of a humidification device of the invention before its cutting.
Figure 10B:
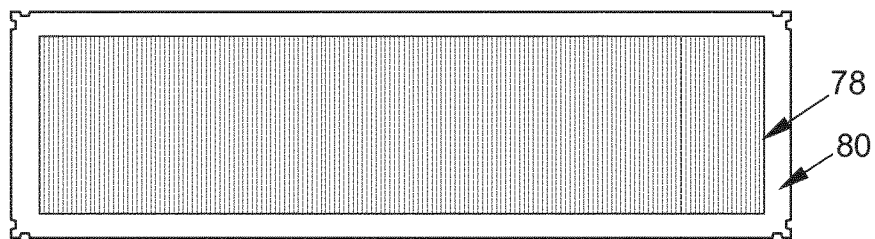
FIG. 10B shows a plan view of a dry layer arrangement of a humidification device of the invention after its cutting.

FIG. 10 shows dry layer arrangement 56 after its joining by means of adhesive layers 86 and 88 in a plan view (FIG. 10A). The joining can occur, for example, by means of a continuous rolling process. It is also advantageous initially to keep the outer adhesive layers 88 still coated by a backing film (paper or plastic), which is removed only before the joining and pressing with membrane 54. After the joining together of the individual layers, dry layer arrangement 56 is cut to its final size (FIG. 10B).

Figure 11:
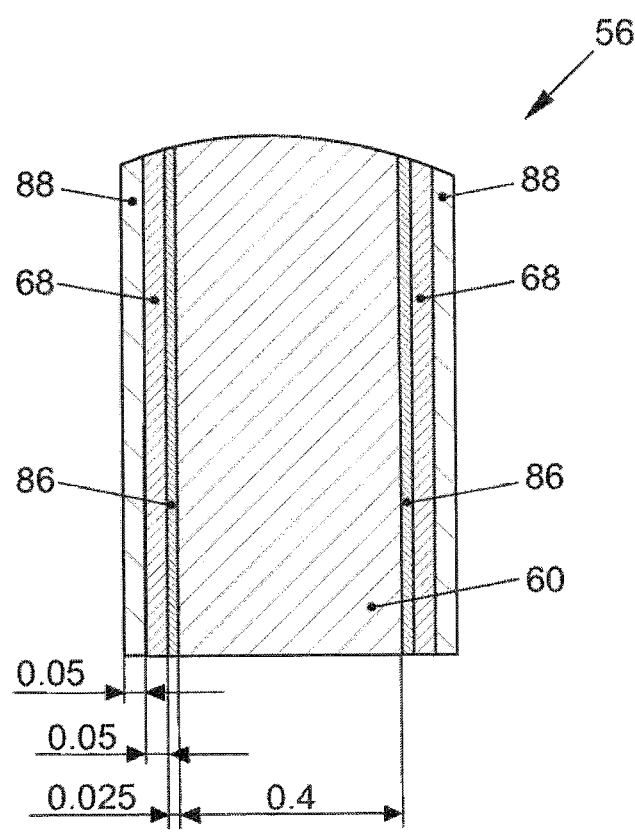
FIG. 11 shows a sectional view of a dry layer arrangement of a humidification device of the invention.

FIG. 11 shows the structure of dry layer arrangement 56 according to the illustrated exemplary embodiment in a cross-sectional detailed view, in which the layer thicknesses are also evident (specifications in mm).

Figure 12:
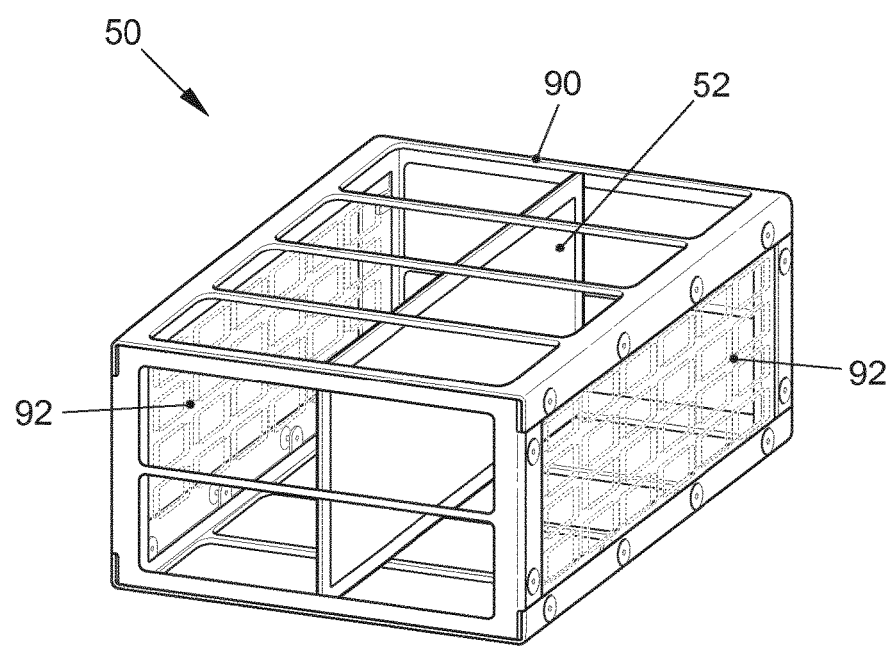
FIG. 12 shows a holding cartridge for a stack of a plurality of structural units of a humidification device.

FIG. 12 shows further details on the structure of the humidification device 50 of the invention. Accordingly, stack 52, of which by way of example only a dry or wet layer arrangement is shown here, is arranged in a holding cartridge 90 between two end plates 92. In this case, so many dry or wet layer arrangements and membranes arranged therebetween are stacked in cartridge 90 until it is filled so far that after the closing of the cartridge the components press sealingly on top of one another.

Holding cartridge 90 with humidifier stack 52 located therein is then disposed in a housing (not shown), which has connections for the process gas to be supplied to the fuel cell and to be humidified and for the humidified exhaust gas removed from the fuel cell. For example, the dry process gas can be introduced into stack 52 through the open side area of cartridge 90, lying above in FIG. 12, and taken out from the bottom side of the cartridge. On the other hand, the relatively humidified exhaust gas of the fuel cell can be introduced into stack 52 through the front open side of cartridge 90 and be taken away through the open side lying in the back in the illustration. The housing can have suitable seals to separate the corresponding compartments.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A humidification device for humidifying process gases for fuel cells, the humidification device comprising a stack of repeating components comprising:
  a water vapor-permeable membrane;
  a first layer arrangement arranged on a first side of the membrane comprising:
    a first flow layer for conducting a process gas to be humidified, comprising a plurality of flow channels running parallel to the membrane, the plurality of flow channels being provided in an active area of the first flow layer; and
    two spacer films that adjoin the first flow layer on both sides thereof, each of the two spacer films having a circumferential frame region and a central recess bounded by the circumferential frame region, the central recess being an opening, a size of the opening corresponding to the entire active area of the first flow layer; and
  a second layer arrangement arranged on a second side of the membrane comprising:
    a second flow layer for conducting a humidified gas comprising a plurality of flow channels running parallel to the membrane; and
    two protective films that adjoin the second flow layer on both sides thereof, with a first one of the two protective films being arranged between the membrane and a first side of the second flow layer and a second one of the two protective films arranged on a second side of the second flow layer, and each of the two protective films having a plurality of through-openings at least in active area corresponding to an active area of the second flow layer, the through-openings covering 30 to 80% of the active area of each of the two protective films,
  wherein outermost edges of the first one of the two protective films are aligned with outermost edges of the membrane and outermost edges of the second flow layer, such that the outermost edges of the first one of the two protective films abuts with the outermost edges of the membrane and the outermost edges of the second flow layer.

2. The humidification device according to claim 1, wherein the through-openings cover 40 to 70% of the active area of each of the two protective films.

3. The humidification device according to claim 1, wherein the through-openings of the two protective films have a circular shape with diameters of at most 1 mm.

4. The humidification device according to claim 1, wherein the protective films and/or the spacer films independently of one another have a layer thickness in a range of 20 to 120 µm.

5. The humidification device according to claim 1, wherein the flow channels of the first flow layer and the flow channels of the second flow layer run in intersecting directions.

6. The humidification device according to claim 1, wherein the flow channels of the first and/or second flow layer are open on both sides and are formed by a plurality of flow lands running spaced apart from one another.

7. The humidification device according to claim 1, wherein the two spacer films of the first layer arrangement are each joined to the first flow layer by an adhesive layer adjoining the first flow layer on both sides and the two protective films of the second layer arrangement are each joined to the second flow layer by an adhesive layer adjoining the second flow layer on both sides.

8. The humidification device according to claim 1, wherein the components that repeat do not comprise any porous layer of a diffusion medium.

9. The humidification device according to claim 1, wherein the stack of components is disposed in a housing, which is formed to connect a plurality of first flow layers to a process gas feed of a fuel cell and connects a plurality of second flow layers to an exhaust gas discharge line of a fuel cell.

10. A fuel cell arrangement comprising:
a fuel cell stack with a plurality of cathode sections and a plurality of anode sections;
an anode process gas supply; and
a cathode process gas supply,
wherein the cathode process gas supply and/or the anode process gas supply comprise the humidification device according to claim 1 for humidifying a cathode process gas or an anode process gas.

11. The humidification device according to claim 1, wherein the through-openings cover 55 to 65% of the active area of each of the two protective films.

12. The humidification device according to claim 1, wherein the through-openings of the two protective films have a circular shape with diameters of-at most 700 µm.

13. The humidification device according to claim 1, wherein the through-openings of the two protective films have a circular shape with diameters of at most 400 µm.

14. The humidification device according to claim 4, wherein the protective films and/or the spacer films independently of one another have a layer thickness in a range of 30 to 100 µm.

15. The humidification device according to claim 4, wherein the protective films and/or the spacer films independently of one another have a layer thickness in a range of 40 to 60 µm.

16. The humidification device according to claim 4, wherein outermost edges of the circumferential frame region of each of the two spacer films are aligned with outermost edges of the membrane and outermost edges of the first flow layer.

* * * * *